UNITED STATES PATENT OFFICE.

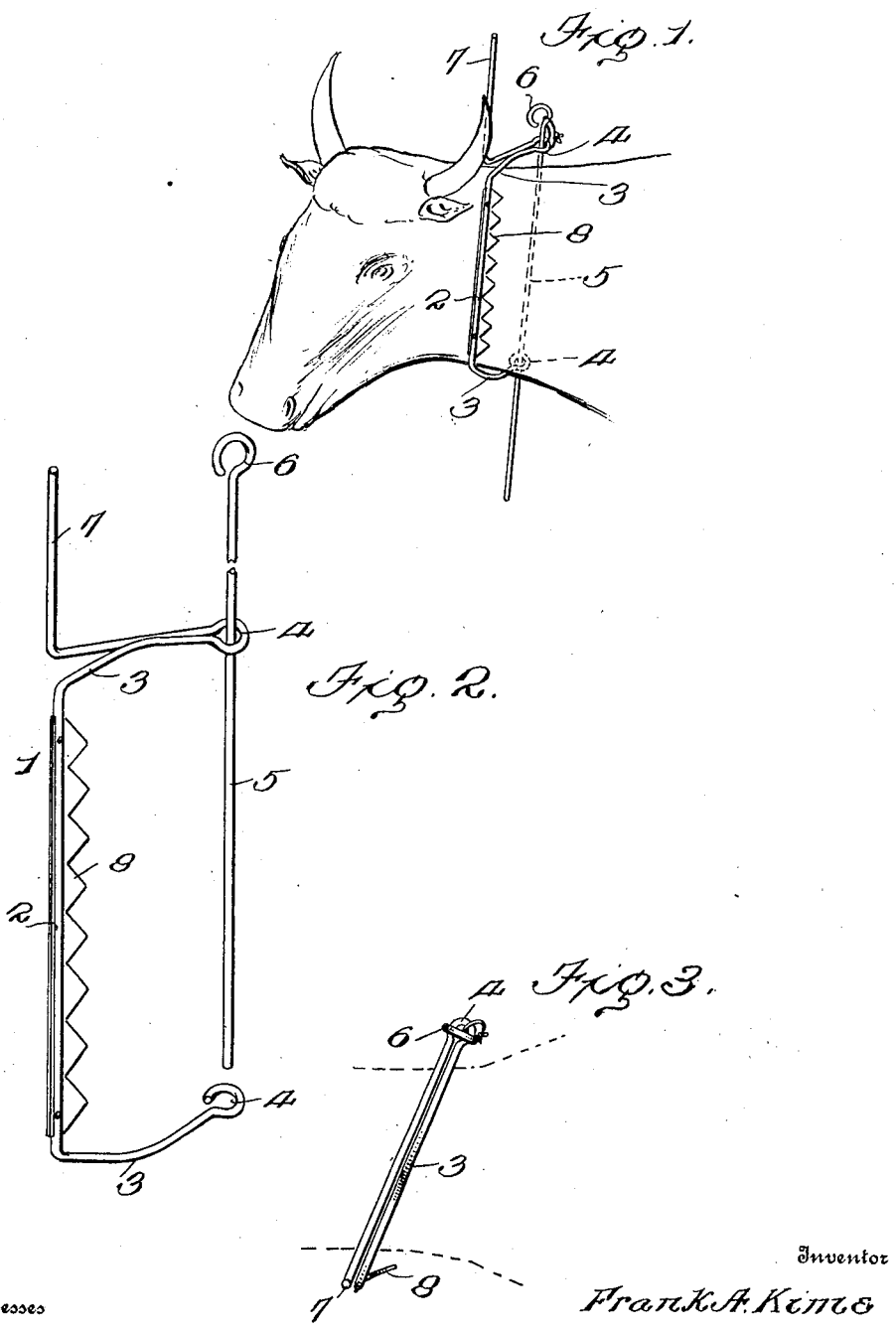

FRANK A. KIME, OF BAKER CITY, OREGON.

POKE.

No. 913,510.

Specification of Letters Patent.

Patented Feb. 23, 1909.

Application filed September 2, 1908. Serial No. 451,406.

*To all whom it may concern:*

Be it known that I, FRANK A. KIME, citizen of the United States, residing at Baker City, in the county of Baker and State of Oregon, have invented certain new and useful Improvements in Pokes, of which the following is a specification.

This invention relates to animal pokes and particularly contemplates the construction of a poke formed of a minimum number of parts and capable of being manufactured at a low cost.

One of the objects of this invention is to provide a poke that will not cause an animal inconvenience when the same is carried by it under ordinary conditions, and which will effectively stop an animal from passing over or through restricted places, by inflicting pain on the side of an animal's neck.

With this and other objects in view, this invention comprises certain novel constructions, combinations and arrangements of parts illustrated in the accompanying drawings.

For a full understanding of the invention, reference is to be had to the following description and accompanying drawings, in which:—

Figure 1 is a view in side elevation illustrating the application of my improved animal poke; Fig. 2 is a perspective view thereof; and, Fig. 3 is a top plan view showing the oblique position of the poke on the animal's neck.

Corresponding and like parts are referred to in the following description and indicated in all the views of the drawings by the same reference characters.

A poke constructed in accordance with my invention embodies a frame or bow 1 which is designed to embrace the neck of the breechy animal and which is preferably constructed of an integral strip of suitable metal that is bent to form a side bar 2 arranged to extend along one side of the animal's neck, and upper and lower cross bars 3, the latter being substantially parallel and formed at the opposite ends of the side bar and being designed to extend obliquely of the animal's neck above and below the same, as shown in Figs. 1 and 3. The cross bars 3 terminate at their ends opposite to the side bar in vertically alining loops or eyes 4 arranged to accommodate a rod 5 which is slipped downwardly through the eyes and is retained in position therein by means of a finger loop 6 formed at the upper end of the rod and abutting against the upper eye 4. This rod extends along the opposite side of the animal's neck from the side bar 2 and serves to effectually retain the frame in position thereon, it being thought that in practice the rod will remain in engagement with the eyes 4 during the capering of the animal but if desired as a precautionary measure a cord or other suitable bond may be passed through the finger loop 6 and the adjacent eye 4 to detachably connect the parts together.

Rigidly secured to the frame 1 and projecting outwardly beyond the same preferably near or in vertical alinement with the side bar 2, is an upwardly disposed arm 7 that in the present instance is formed by returning the metal strip across the frame from the upper eye 4 and in proximity to the upper cross bar 3 and bending the end of the strip upwardly as shown. The arm 7 is designed to abut against the parts of a fence upon the attempt of the animal to pass therethrough or break down the same and said arm is thus pressed rearwardly and is arranged to effect the swinging movement of the frame 1 in a similar direction and about the rod 5 to cause the side bar 2 to press against the neck of the animal, the side bar being formed or provided with any desired number of rearwardly disposed teeth 8 which in the normal position of the device are supported in spaced relation to the animal's neck and which are arranged by and upon the rearward movement of the side bar 2 to be forced into the flesh of the animal which will naturally under the influence of pain, cease its efforts to escape through the fence.

From the foregoing description in connection with the accompanying drawing, it will be manifest that I have provided an animal poke which is very efficient in operation, which embodies to a marked degree the elements of simplicity, durability, and strength, and which consists of comparatively few parts that may be easily and cheaply manufactured and readily assembled.

It is well known that it is often difficult to handle some domesticated animals and as a result it is sometimes impossible to place on the necks of such animals a poke, which is complicated in construction and hard to apply, but in contradistinction, it will be at once apparent that the construction and the application of my improved poke is such that it may be quickly applied to the neck of any animal, with very little trouble.

Having thus described the invention, what is claimed as new is:—

1. An animal poke comprising a frame or bow designed to embrace the neck of an animal and consisting of a side bar and upper and lower cross bars, the side bar being equipped with pain-inflicting means, and one of the cross bars being returned upon itself with the return portion angularly disposed to constitute an engaging arm, and a rod secured to the cross bars and about which the frame is designed to swing.

2. An animal poke comprising a frame or bow designed to embrace the neck of an animal and consisting of a side bar and upper and lower cross bars, the former being provided with pain-inflicting means, and the latter being doubled upon themselves to constitute eyes, a rod accommodated in the eyes and about which the frame is designed to swing, the upper cross bar being returned upon itself beyond the corresponding eye and being angularly disposed in proximity to the side bar to form an engaging arm.

In testimony whereof I affix my signature in presence of two witnesses.

FRANK A. KIME. [L. S.]

Witnesses:
S. O. CORRELL,
W. F. BUTCHER.